(12) United States Patent
Tomita et al.

(10) Patent No.: US 8,189,688 B2
(45) Date of Patent: May 29, 2012

(54) IMAGE DECODING DEVICE AND IMAGE DECODING METHOD

(75) Inventors: Hiroto Tomita, Fukuoka (JP); Takashi Hashimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 795 days.

(21) Appl. No.: 12/162,852

(22) PCT Filed: Dec. 1, 2006

(86) PCT No.: PCT/JP2006/324067
§ 371 (c)(1),
(2), (4) Date: Jan. 8, 2009

(87) PCT Pub. No.: WO2007/091367
PCT Pub. Date: Aug. 16, 2007

(65) Prior Publication Data
US 2009/0220009 A1 Sep. 3, 2009

(30) Foreign Application Priority Data

Feb. 6, 2006 (JP) ................................. 2006-028140

(51) Int. Cl.
*H04N 7/68* (2006.01)
(52) U.S. Cl. ........... 375/240.27; 375/240.25; 375/24.26; 375/240.29; 382/260; 382/264; 382/275
(58) Field of Classification Search ..... 375/240–240.29; 382/232–275
See application file for complete search history.

(56) References Cited

U.S. PATENT DOCUMENTS

| 5,715,008 | A | 2/1998 | Sekiguchi et al. |
| 2006/0051068 | A1* | 3/2006 | Gomila .................... 386/114 |
| 2007/0009037 | A1* | 1/2007 | Yamaguchi et al. ..... 375/240.16 |

FOREIGN PATENT DOCUMENTS

| CN | 1720729 | 1/2006 |
| EP | 0 794 671 | 9/1997 |
| JP | 9-182068 | 7/1997 |
| JP | 9-247681 | 9/1997 |
| JP | 10-23424 | 1/1998 |
| JP | 2003-32686 | 1/2003 |
| JP | 2005-295404 | 10/2005 |
| JP | 2005-311512 | 11/2005 |
| WO | 2004/064396 | 7/2004 |

OTHER PUBLICATIONS

A New Temporal Error Concealment Method for H.264 using Adaptive Block Sizes by Kim et al; Publisher: IEEE; Year: 2005.*

(Continued)

*Primary Examiner* — Taghi Arani
*Assistant Examiner* — Madhuri Herzog
(74) *Attorney, Agent, or Firm* — Wenderoth Lind & Ponack, L.L.P.

(57) ABSTRACT

An image decoding device includes an error detecting unit that detects a decoding error in each unit area in one frame of an image; an error compensating determining unit that determines an error compensating area for which error compensation should be performed for the decoding error; and an error compensating unit that performs error compensation to the error compensating area. The error compensating area determining unit determines a unit area where the decoding error occurs, and a predetermined area adjacent to the unit area, as the error compensating area.

12 Claims, 11 Drawing Sheets

OTHER PUBLICATIONS

A Robust Error Concealment Technique Using Data Hiding for Image and Video Transmission Over Lossy Channels by Adsumilli et al; Publisher: IEEE; Year: 2005.*

International Search Report issued Feb. 20, 2007 in the International (PCT) Application No. PCT/JP2006/324067.

Supplementary European Search Report issued Mar. 4, 2009 in connection with EP 06 82 3546 corresponding to the present U.S. application.

List, P. et al., *Adaptive Deblocking Filter, IEEE Transactions on Circuits and Systems for Video Technology*, vol. 13, No. 7 (Jul. 2003), pp. 614-619.

* cited by examiner

IMAGE DECODING DEVICE AND IMAGE DECODING METHOD

BACKGROUND OF THE INVENTION

1. Technical Field

The present invention relates to an image decoding device operable to effectively perform error compensation when a decoding error occurs in decoding of compressed image data, and an image decoding method related thereto.

2. Background Art

MPEG 2 and MPEG 4 are used as encoding systems of moving pictures. In these days, "H.264/MPEG 4 AVC" (it's called as "H.264" hereinafter), whose compression efficiency is further improved comparing to MPEG 4, is standardized by the Joint Video Team (it's called as "JVT" hereinafter).

FIG. 13 is a block diagram of an image decoding device standardized by MPEG 4.

A variable-length decoding unit 100 decodes a variable-length encoded data stream according to a variable-length encoding table. An inverse AC/DC predicting unit 101 performs AC/DC prediction, and outputs quantized coefficients QF [x][y]. An inverse quantizing unit 102 outputs DCT coefficients F [x][y] by performing inverse quantization on the quantized coefficients QF [x][y]. An inverse DCT unit 103 performs inverse DCT on the DCT-coefficients F [x][y]. At the time of decoding a macro block (it is called as "intra macro block" hereinafter) that has been encoded by intra macro block encoding, a pixel value of a decoded image is obtained. At the time of decoding a macro block (it is called as "inter macro block" hereinafter) that has been encoded by inter macro block encoding, a difference pixel value with a previous image is obtained. A motion compensating unit 104 obtains a pixel of a data image using the difference pixel value.

FIG. 14 is a block diagram of an image decoding device standardized by H.264.

Dissimilar to an image decoding device based on MPEG 4, the image decoding device based on H.264 comprises an in-loop filter 112. The in-loop filter 112 performs de-block filtering on the pixel value after decoding at a boundary of block for an encoding unit. The de-block filtering can reduce de-block noise of a displayed image.

The de-block filtering in H.264 is explained. FIG. 15 is an illustration of a pixel that is dealt with in de-block filtering. Filtering is performed using pixels that exist both sides of the boundary of block in the figure. In the figure, each of a matrix shows a pixel, and a sign is attached to each pixel in order to distinguish.

First, whether or not the de-block filtering will be executed is judged according to Equation 1.

$$\text{filterSamplesFlag}=(bS!=0\&\&Abs(p0-q0)<\alpha\&\&Abs(p1-p0)<\beta\&\&Abs(q1-q0)<\beta) \quad \text{[Equation 1]}$$

Here, the left-hand side of Equation 1 is a flag that indicates whether the de-block filtering will be executed or not. Equation 1 is defined in H.264. A variable "bS" of the right-hand side is a parameter showing a level of smoothing in the de-block filtering, and may have some integer value from a value "0" to a value "4".

When the variable "bS" is the value "0", the in-loop filter 110 does not perform the de-block filtering. When the variable "bS" is one of the value "1", the value "2", and the value "3", the de-block filtering is performed according to Equation 2. When the variable "bS" is the value "4", the de-block filtering is performed according to Equation 3.

$$p0'=\text{Clip1}(p0+\Delta)$$

$$\Delta=\text{Clip3}(-tc,tc,((((q0-p0)<<2)+(p1-q1)+4)>>3))$$

$$p1'=p1+\text{Clip3}(-tc0,tc0,(p2+((p0+q0)>>1)-p1<<1))>>1) \quad \text{[Equation 2]}$$

$$p0'=(p2+2*p1+2*p0+2*q0+q1+4)>>3$$

$$p1'=(p2+p1+p0+q0+2)>>2$$

$$p2'=(2*p3+3*p2+p1+p0+q0+4)>>3 \quad \text{[Equation 3]}$$

Each variable, such as a variable "p0" included in Equation 1, Equation 2, and Equation 3 is a pixel value of a pixel that corresponds to each variable, such as "p0" specifying a pixel in FIG. 15.

As mentioned above, the de-block filtering is performed using a pixel, which is beyond a unit area being a decoding target. In other words, using a pixel of a unit area, which is adjacent to a certain unit area, the de-block filtering of pixel to the certain unit area is performed.

Here, in H.264 (and MPEG 4), the variable-length decoding unit 100 detects a bit train that matches referring to the variable-length encoding table, and decodes a data stream.

At this time, in the data stream of the decoding target, it may not be fallen under any patterns of bit trains included in the variable-length encoding table. In this case, it is judged that a decoding error occurs. When such a decoding error occurs, all unit areas (for example, a slice) are dealt with as areas where the decoding error has occurred. Thus, when the decoding error occurs, variable-length decoding is restarted from the next unit area. The pixel value of the unit area, where the decoding error has occurred, is not used.

Here, since the pixel value of the unit area, where the decoding error has occurred, is not used, if the unused unit area is left as it is, the quality of a displayed image becomes poor.

In order to prevent making the quality of the displayed image become poor, technology, which replaces a value of a pixel included in a unit area where a decoding error has occurred to a value of pixel included in a past frame in terms of time, has been proposed (for example, Document 1). Alternatively, technology, which replaces a value of a pixel included in a unit area where a decoding error has occurred to a value of a pixel included in another area within the same frame, has been proposed (for example, Document 2).

With the conventional technology, however, only the value of the pixel, which is included in the unit area where the decoding error has occurred, is replaced to a value of another pixel. Here, since the de-block filtering is performed by the in-loop filter 110, the pixel, which is located in the boundary of the unit area where the decoding error has occurred, is used for the de-block filtering of a neighboring unit area. In other words, the pixel, in which the decoding error has occurred, is used in the de-block filtering of the neighboring unit area. For this reason, not only the unit area where the decoding error has occurred, but also the pixel of neighboring unit area, in which the de-block filtering is performed by using the pixel included in the unit area where the decoding error has occurred, becomes unstable. Therefore, the unit area, which is adjacent to the unit area where the decoding error has occurred, is influenced by the decoding error.

Although the value of the pixel, which is included in the unit area where the decoding error has occurred, can be replaced to a value of another pixel, a neighboring pixel influenced by the decoding error remains as it is. For this reason, in the conventional technology, the bad influence remains in the image quality of this neighboring pixel, and there is a problem that causes deterioration in the displayed image.

For example, as shown in FIG. 16, a pixel of a unit area, which is adjacent to a unit area where a decoding error has occurred, is influenced by the decoding error.

FIG. 16 is a diagram showing an influence caused by a decoding error in the conventional technology.

In the pixel (a circle with an X sign in the figure) included in the unit area where the decoding error has occurred, pixels surrounded by a frame is used for de-block filtering in a neighboring unit area. For this reason, also in a unit area where the decoding error does not occur, a bad influence occurs at the time of de-block filtering (a circle with a Δ sign in the figure). Even if a value of a pixel, which is included in a unit area where the decoding error has occurred, is replaced to a value of another pixel (right-hand side in the figure), pixels to which Δ signs are given remain as it is. Thus, the quality of the displayed image becomes poor.

[Document 1] Published Japanese patent application laid-open on No. H10-23424
[Document 2] Published Japanese patent application laid-open on No. H09-182068

DISCLOSURE OF THE INVENTION

Problem(s) to be Solved by Invention

An object of the present invention is to provide an image decoding device operable to perform error processing including a pixel influenced by the decoding error due to filtering in addition to a unit area where the decoding error has occurred, and an image decoding method related thereto.

Means for Solving Problem(s)

A first aspect of the present invention provides an image decoding device comprising: an error detecting unit operable to detect a decoding error in each unit area in one frame of an image; an error compensating area determining unit operable to determine an error compensating area for which error compensation for the decoding error should be performed; and an error compensating unit operable to perform error compensation for the error compensating area, wherein the error compensating area determining unit determines the unit area where the decoding error occurs and a predetermined area adjacent to the unit area where the decoding error occurs as the error compensating area.

According to the above configuration, an image decoding device can perform error compensation not only for a unit area where the decoding error occurs, but for an area affected by the unit area where the decoding error occurs.

A second aspect of the present invention provides an image decoding device as defined in the first aspect of the present invention, wherein the predetermined area includes a target pixel of in-loop filtering using a pixel included in the unit area where the decoding error occurs.

According to the above configuration, adjacent pixels affected by a pixel included in the unit area where the decoding error occurs are handled as the target of the error compensation. Especially, this is effective for image processing including filtering for an area exceeding the unit area such as de-block filtering.

A third aspect of the present invention provides an image decoding device as defined in the first aspect of the present invention, wherein the unit area comprises is constituted in a unit of at least one of a slice and a macro block defined by at least one of the H.263 standard and the H.264 standard.

A forth aspect of the present invention provides an image decoding device as defined in the third aspect of the present invention, wherein the unit area is constituted in a unit of at least one of the slice and the macro block in accordance with receiving condition.

According to the above configuration, the image decoding device can control the amount of calculation for error compensation.

A fifth aspect of the present invention provides an image decoding device as defined in the first aspect of the present invention, wherein the decoding error includes at least one of an arithmetic decoding error and a variable-length decoding error.

According to the above configuration, the image decoding device can detect the decoding error easily.

A sixth aspect of the present invention provides an image decoding device as defined in the second aspect of the present invention, further comprising a judging unit operable to judge a in-loop filtering condition is in either an executed condition or a non-executed condition, wherein when a judging result of the judging unit indicates that the in-loop filtering is in the executed condition, the error compensating area determining unit determines the area including the target pixel of the in-loop filtering using the pixel included in the unit area where the decoding error occurs as the predetermined area.

According to the above configuration, the pixel included in the predetermined area is error-compensated only when the pixel is affected by the pixel included the unit area where the decoding error occurs. As a result, the image decoding device can effectively reduce the amount of calculation for error compensation.

A seventh aspect of the present invention provides an image decoding device as defined in the second aspect of the present invention, wherein the error compensating area determining unit changes the predetermined area when a target area of in-loop filtering changes.

According to the above configuration, the image decoding device performs error compensation effectively.

An eighth aspect of the present invention provides an image decoding device as defined in the first aspect of the present invention, wherein the error compensating unit replaces a value of a pixel included in the error compensating area with a value of a corresponding pixel included in the one frame of the image.

According to the above configuration, the image decoding device performs error compensation effectively. In addition, the image decoding device can reduce disorder of a displayed image.

A ninth aspect of the present invention provides an image decoding device as defined in the first aspect of the present invention, wherein the error compensating unit replaces a value of a pixel included in the error compensating area with a value of a pixel neighboring the error compensating area.

According to the above configuration, the image decoding device performs error compensation with ease. In addition, it is able to lessen the capacity of memory necessary for the error compensation.

A tenth aspect of the present invention provides an image decoding device as defined in the first aspect of the present invention, wherein the error compensating unit replaces a value of a pixel included in the error compensating area with a fixed value.

According to the above configuration, the image decoding device performs error compensation with the simple construction.

An eleventh aspect of the present invention provides an image decoding device as defined in the first aspect of the present invention, wherein the error compensating unit replace a value of a pixel included in the predetermined area of the error compensating area with a value of a corresponding pixel for which the in-loop filtering has been performed, the corresponding pixel being included in the predetermined area.

According to the above configuration, the image decoding device can exclude influence of the in-loop filtering using the pixel where the decoding error occurs.

According to the present invention, error compensation is performed not only for the unit area (the unit in decoding) where the decoding error occurs within the frame of the image, but also for a pixel included in another unit area than the unit area, which may be influenced by this decoding error. As a result, even when the decoding error occurs in image decoding while filtering at a boundary of the unit area, it is possible to suppress deterioration of the quality of a displayed image.

Moreover, determining the error compensating area for which the error compensation should be performed based on the judgment of filtering execution enables to perform effective error compensation. Furthermore, not performing the error compensation for pixels that do not need the error compensation enables to effectively suppress deterioration of the quality of the displayed image.

In addition, the error compensation is performed by replacing the value of the pixel included in the error compensating area with the value of the prior frame, the value of the other pixel in the same frame, or the fixed value, thereby suppressing deterioration of the quality of image with ease and effectively.

DESCRIPTION OF SYMBOLS

Figure 1:
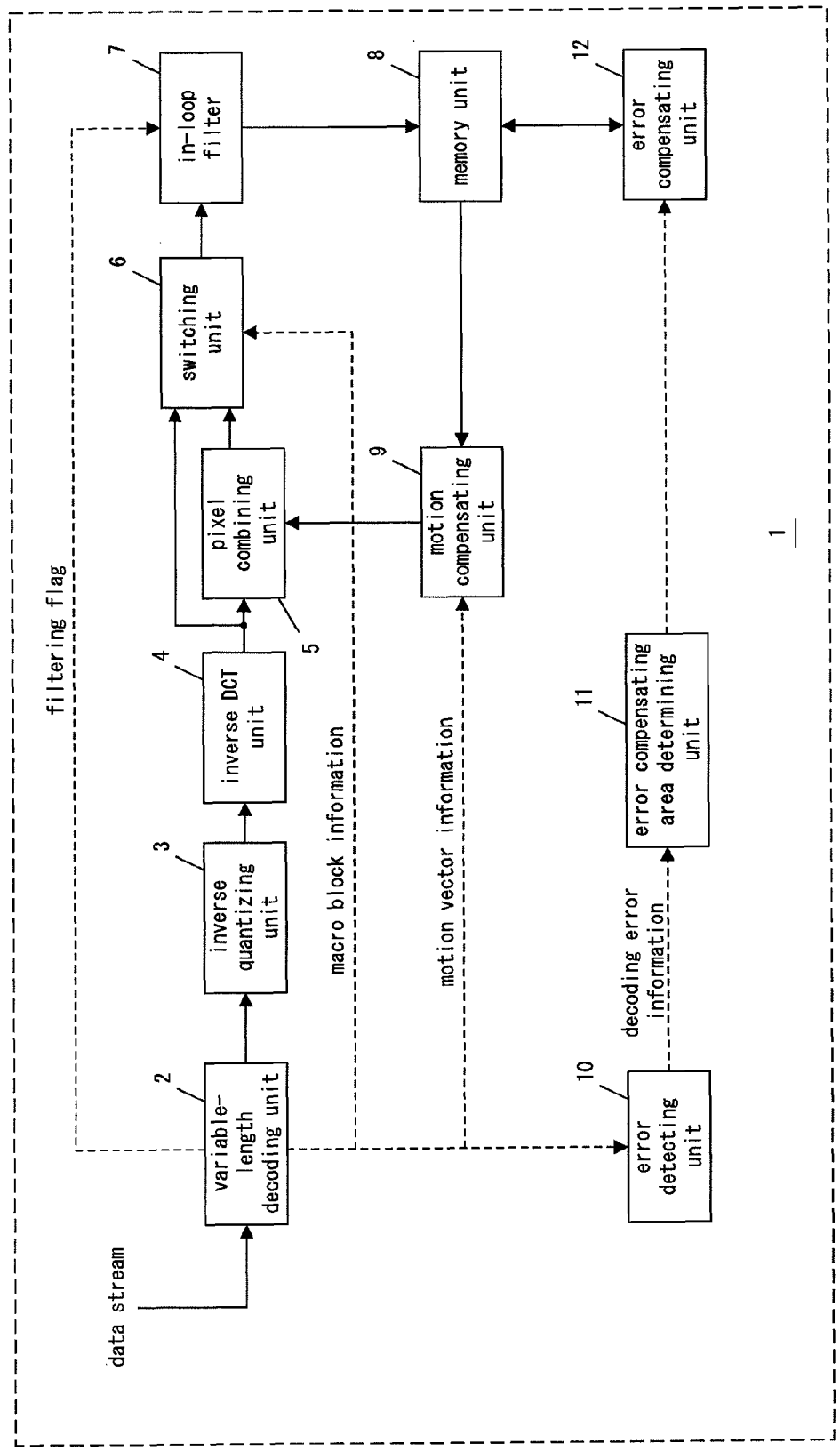
FIG. 1 is a block diagram of an image decoding device in Embodiment 1 of the present invention.

1: image decoding device
2: variable-length decoding unit
3: inverse quantizing unit
4: inverse DCT unit
5: pixel combining unit
6: switching unit
7: in-loop filter
8: memory unit
9: motion compensating unit
10: error detecting unit
11: error compensating area determining unit
12: error compensating unit
13: arithmetic decoding unit

DETAILED DESCRIPTION OF THE INVENTION

The embodiments of the present invention are explained in the following, with reference to the accompanying figures.

Embodiment 1

Figure 2:
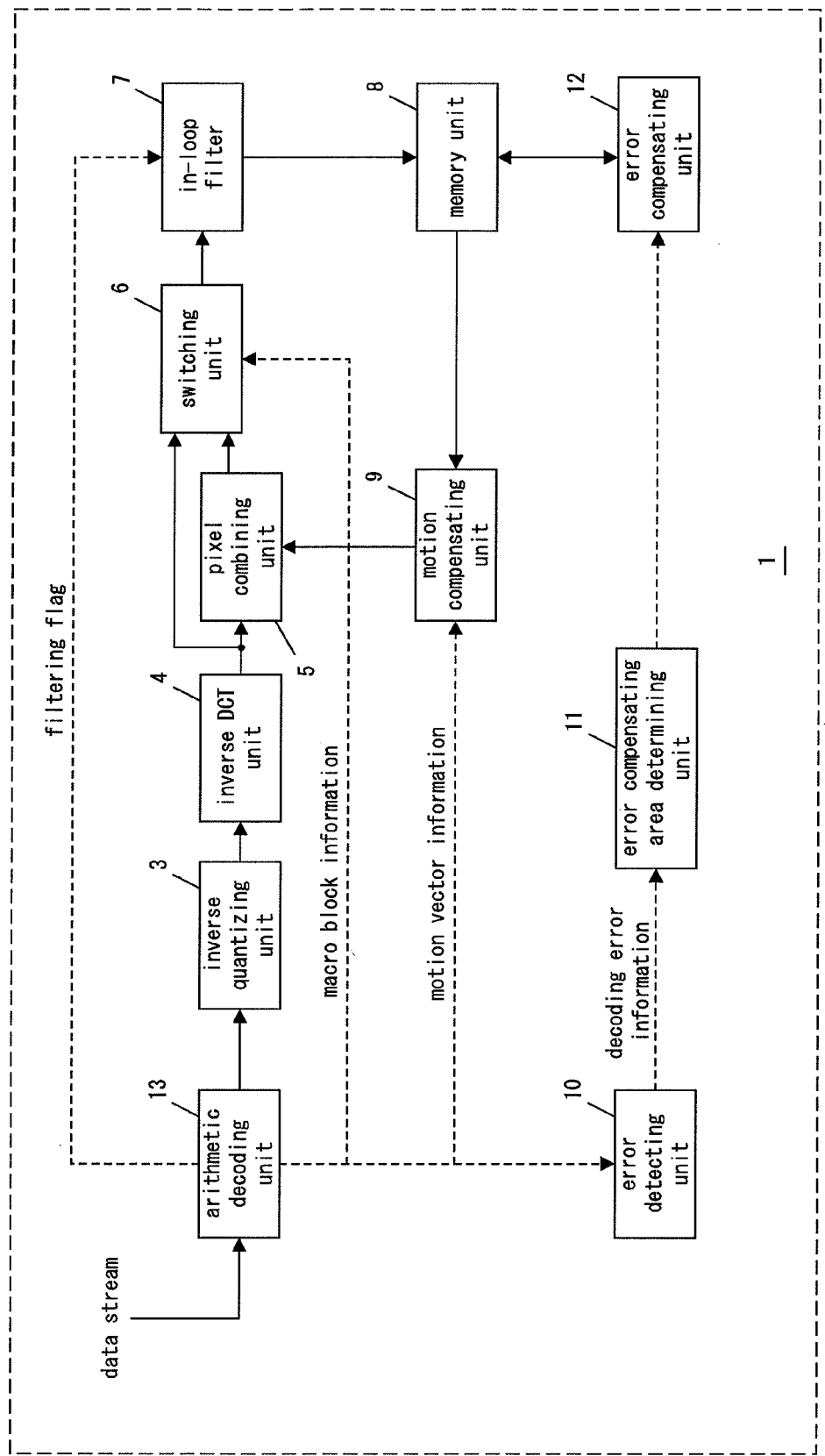
FIG. 2 is a block diagram of an image decoding device in Embodiment 1 of the present invention.

FIG. 1 and FIG. 2 are block diagrams of an image decoding device in Embodiment 1 of the present invention.
<Total Construction>

First, construction of the image decoding device 1 will now be explained.

The image decoding device 1 decodes an encoded data stream.

The data stream is inputted into a variable-length decoding unit 2. The variable-length decoding unit 2 performs variable-length decoding on the inputted data stream. In particular, the variable-length decoding unit 2 analyzes a header included in the inputted data stream, and further decodes the variable-length encoded data stream, referring to a variable-length encoding table.

First, the variable-length decoding unit 2 detects a start code included in a data stream, and then decodes various parameters from header information included in the following start code. At this time, the variable-length decoding unit 2 also detects a filtering flag included in a slice defined in standards, such as H.264 and H.263. The variable-length decoding unit 2 outputs this filtering flag to an in-loop filter 7.

Similarly, the variable-length decoding unit 2 detects whether a macro block for decoding is an intra macro block or an inter macro block, and outputs a detection result to a switching unit 6 as macro block information. The variable-length decoding unit 2 outputs motion vector information to a motion compensating unit 9, and outputs the variable-length decoded result to an inverse quantizing unit 3 as quantization data.

Here, the variable-length decoding unit 2 decodes a certain unit area included in an image of one frame as one unit. For example, a unit area is based on "slice" or "macro block" which are defined in H.263 or H.264.

In decoding according to H.263 and H.264, a "slice" is a unit for decoding. For this reason, it is preferable to set this "slice" as a criterion for the unit area considering a relation with decoding.

A size of slice, however, is variable; thus, the entire of one frame is sometimes defined as one slice. When the size of slice becomes larger, the number of pixels, to which error compensation is performed, increases. Thus, it causes an increase of a calculation amount. Since the calculation amount required for the error compensation increases, it may not catch up displaying speed. Thus, it may cause a freeze of a display. Therefore, when a problem, which is caused by the increase of the calculation amount for the error compensation, occurs, the criterion of the unit area can be a "macro block" instead of the "slice".

For example, when a reception status is good, generating frequency of error compensation is low; thus, it is preferable to set the "slice" as a criterion for a unit area. This is because it is hard to think that a problem of increasing a calculation amount related to the error compensation occurs. On the other hand, when a reception status is bad, the generating frequency of error compensation is high; thus, it is preferable to set the "macro block" as a criterion for a unit area. This is because it is possible to suppress a calculation amount required for error compensation by using a macro block, which does not include a decoding error, as it is.

Here, a reception status is defined based on a receiving level or a receiving waveform received in wireless communication, a rate of error for stream data of an image, generating frequency, or a generating amount of a decoding error.

A block, which judges a reception status, selects either the "slice" or the "macro block" as the criterion of the unit area. Here, the reception status may be judged by electric power or a voltage level of a received data stream, and may be also judged by generating frequency of a decoding error.

Alternatively, according to a size of the "slice" area to be dealt with, it is possible to select either the "slice" or the "macro block" as the criterion of the unit area.

In addition, not only may a single slice or a macro block be a unit area, but also a plurality of slices and macro blocks may be the unit area.

In FIG. 1, although the image decoding device 1 comprises the variable-length decoding unit 2, the image decoding device 1 may comprise an arithmetic decoding unit 13 instead of the variable-length decoding unit 2 as shown in FIG. 2.

The inverse quantizing unit 3 performs inverse quantization on the quantization data outputted from the variable-length decoding unit 2, and outputs DCT coefficients to an inverse DCT unit 4.

The inverse DCT unit 4 performs inverse DCT processing on the DCT coefficients outputted from the inverse quantizing unit 3, and outputs a decoding pixel value or a difference pixel value.

According to the macro block information, when the macro block for decoding is an intra macro block, the switching unit 6 selects and outputs a decoding pixel value outputted from the inverse DCT unit 4.

According to macro block information, when a macro block for decoding is an inter macro block, the switching unit 6 selects and outputs a decoding pixel value outputted from a pixel combining unit 5.

The motion compensating unit 9 generates a prediction reference pixel value based on motion vector information and a reference image stored in a memory unit 8, and outputs it to the pixel combining unit 5. In H.264, the motion compensation unit 9 generates the prediction reference pixel value by using a quarter pel for a luminance element, and a ⅛ pel for chrominance element. In addition, in H.263, a luminance element is a half pel, and a chrominance element is a quarter pel.

The pixel combining unit 5 generates a decoding pixel value by adding a difference pixel value outputted from the inverse DCT unit 4, and a prediction reference pixel value outputted from the motion compensating unit 9. When it is a inter macro block, the decoding pixel value, which is generated by the pixel combining unit 5, is selected by the switching unit 6, and is outputted.

The in-loop filter 7 performs in-loop filtering based on a filtering flag. In Embodiment 1, an image decoding device based on de-block filtering will now be explained as an example of in-loop filtering.

The in-loop filter 7 performs the de-block filtering using a neighboring pixel based on from Equation 1 to Equation 3. In the de-block filtering, a pixel (such as a slice and a macro block), which exceeds the unit area, may be used. For example, in the de-block filtering to a pixel included in a certain unit area i, a pixel, which is included in a unit area i+1 being adjacent to the unit area i, may be used. In this case, the de-block filtering is performed for unit areas striding over the unit area targeted for decoding.

The in-loop filter 7 outputs the result of the de-block filtering to the memory unit 8. Since the memory unit 8 has stored the result outputted by the in-loop filter 7, it means that image data to be used as a displaying image is stored. In addition, image data of the previous displaying image in terms of time is also stored, and is used as a reference image in the motion compensating unit 9.

Here, the variable-length decoding unit 2, the inverse quantizing unit 3, the inverse DCT unit 4, and the motion compensating unit 9 are elements which constitute the decoding unit operable to decode encoded image data. The decoding unit performs basic decoding on the encoded image data.

<Error Detection and Error Compensation>

An error detecting unit 10 detects a decoding error occurred by the decoding in the variable-length decoding unit 2. Referring to the variable-length encoding table, the variable-length decoding unit 2 decodes by detecting a bit train, which is at the same line as the bit train defined by the variable-length encoding table, from a data stream (decoding is performed for every unit area). When any bit train equivalent to the bit train, which is defined by the variable-length encoding table, is detected, the error detecting unit 10 judges that a unit area for decoding is a unit area where the decoding error has occurred.

A pixel value included in a unit area, where a decoding error has occurred, is not used henceforth. When a decoding error is detected, the variable-length decoding unit 2 detects a start code of the next unit area, and newly decodes from the next unit area. Moreover, when a decoding error is detected, error compensation is performed as described in the following.

In addition, when the image decoding device 1 comprises the arithmetic decoding unit 13 instead of the variable-length decoding unit 2, a unit area, where an arithmetic decoding error has occurred, is detected as the unit area where the decoding error has occurred.

<Determination of Error Compensating Area>

The error compensating area determining unit 11 receives the result in the error detecting unit 10, and determines an error compensating area targeted for error compensation.

The determination of the error compensating area will now be explained referring to FIG. 3.

Figure 3:
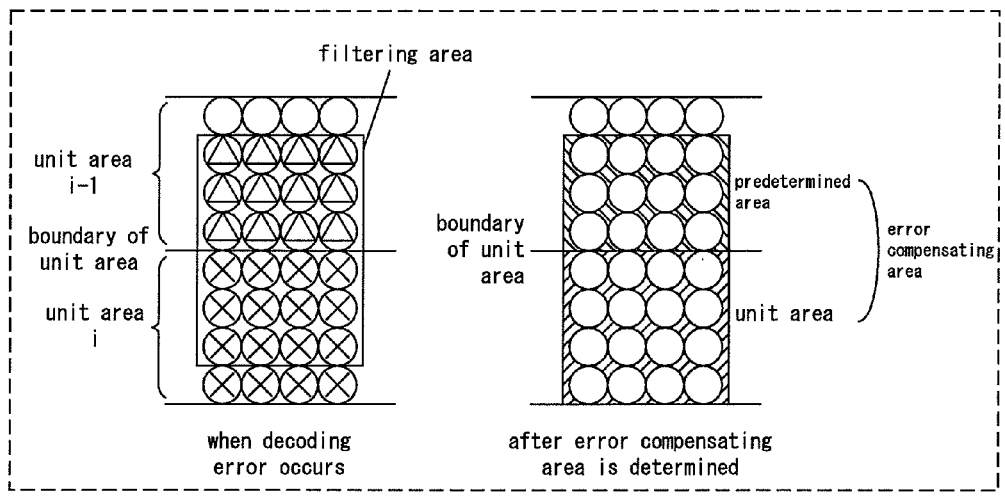
FIG. 3 is a diagram explaining a determination method of an error compensating area in Embodiment 1 of the present invention.

FIG. 3 is a diagram explaining determination of an error compensating area in Embodiment 1 of the present invention.

The left-hand side in FIG. 3 shows a status of a pixel when a decoding error has occurred. A unit area i is a unit area where a decoding error has occurred. A unit area i−1, in which a decoding error has not occurred, is adjacent to the unit area i where a decoding error has occurred. Here, no decoding error occurs in the unit area i−1. However, a pixel included in the unit area i, where the decoding error has occurred, is used for the de-block filtering in the unit area i−1. As a result, using a pixel, to which the de-block filtering (in-loop filter 7 performs) is performed by using the pixel included in the unit area 1, among the pixels included in the unit area i−1 where the decoding error has not occurred, may cause quality deterioration of a displayed image.

In FIG. 3, a ○ sign shows a pixel. Among the pixels, a pixel, to which a Δ sign is given, receives an influence of the de-block filtering that has used the pixel included in the unit area i in which the decoding error has occurred. For this reason, it is not sufficient to determine only the unit area i, where the decoding error has occurred, as the error compensating area.

The right-hand side in FIG. 3 shows a status of the determination of the error compensating area.

In addition to the unit area where the decoding error has occurred, the error compensating area determining unit 11 determines a predetermined area, which is adjacent to this unit area, as the error compensating area. In FIG. 3, a area including a pixel, which is within the area neighboring the unit area 1 and also uses a pixel included in the unit area i in the de-block filtering, is determined as the predetermined area.

The error compensating area determining unit 11 determines an area, in which the unit area i and the predetermined area being part of the unit area i−1 are combined, as the error compensating area.

In FIG. 3, in the unit area i−1, an area, which is up to three pixels from the boundary of the unit area with the unit area i in the vertical direction, is determined as the predetermined area. This is because up to three pixels in the vertical direction use a pixel included in the unit area i in the de-block filtering. For this reason, when a pixel, which is included in the unit area i−1 and uses a pixel included in the unit area i in the de-block filtering, is within the range of two pixels in the vertical direction from the boundary of unit area, the area up to two pixels are determined as the predetermined area.

In FIG. 3, although a case, where there is a boundary of a unit area in the vertical direction in a frame, will now be explained, the direction for the boundary of unit area can be changed to the horizontal direction.

Moreover, the error compensating area determining unit 11 changes the error compensating area according to the change of the target area in the de-block filtering.

<Variation of Error Compensating Area>

Referring to FIG. 4, variation of determination for error compensating areas will now be explained.

FIGS. 4(a) to 4(d) are diagrams explaining a determination method of an error compensating area in Embodiment 1 of the present invention.

In FIGS. 4(a) to 4(d), a shaded area is an area to be determined as an error compensating area.

Figure 4A:
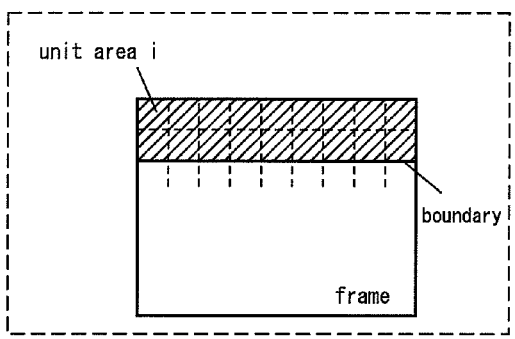
FIGS. 4 (a) to (d) are diagrams explaining a determination method of an error compensating area in Embodiment 1 of the present invention.

In FIG. 4(a), the unit area i, where the decoding error has occurred, is located on the top frame. There are not any pixels other than the pixels, which are included in the unit area i and are used for the de-block filtering. For this reason, in FIG. 4(a), the unit area i is determined as the error compensating area.

Figure 4B:
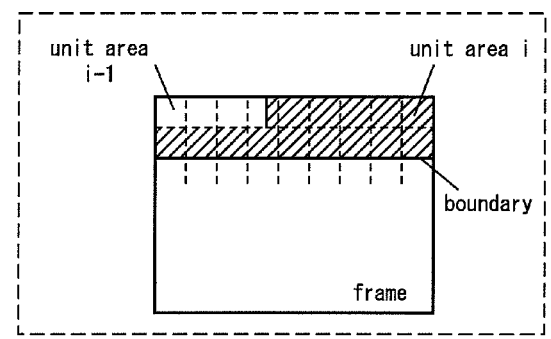

In FIG. 4(b), the unit area i, where the decoding error has occurred, is adjacent to the unit area i−1 in the horizontal direction in the frame. A certain number of pixels of the area, which are the part of the pixels included in the unit area i−1 and are adjacent to the boundary with the unit area i in the horizontal direction, use the pixels included in the unit area i in the de-block filtering. This certain area is determined as the predetermined area. As a result, the predetermined area, which is determined within the unit area i and the unit area i−1, is determined as the error compensating area.

Figure 4C:
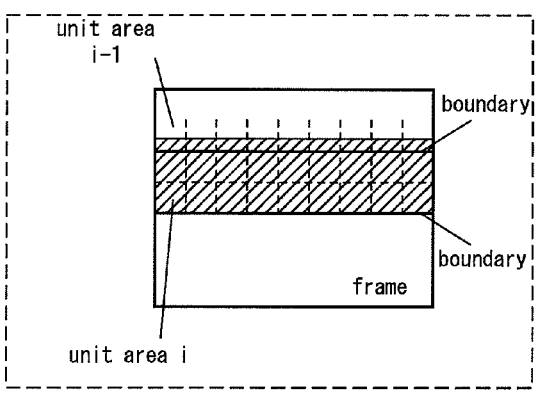
Figure 4D:
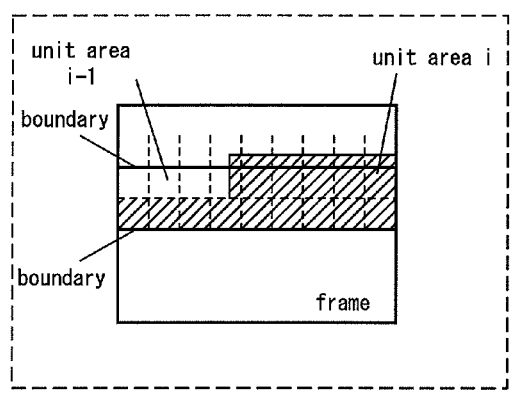

In FIG. 4(c), the unit area i, where the decoding error has occurred, is adjacent to the unit area i−1 in the vertical direction of the frame. A certain number of pixels of the area, which are the part of the pixels included in the unit area i−1 and are adjacent to the boundary with the unit area i in the vertical direction, use the pixels included in the unit area i in the de-block filtering. This certain area is determined as the predetermined area. As a result, the predetermined area, within the unit area i and the unit area i−1, is determined as the error compensating area.

In FIG. 4(c), the unit area i, where the decoding error has occurred, is adjacent to the unit area i−1 in the vertical direction and horizontal direction of the frame. Pixels included in the unit area i are used for the de-block filtering to a certain number of the pixels of the area, which are the part of the pixels included in the unit area i−1 and are adjacent to the boundary with the unit area i in the vertical direction and the horizontal direction. This certain area is determined as the predetermined area. As a result, the predetermined area, within the unit area i and the unit area i−1, is determined as the error compensating area.

In any of the cases in FIGS. 4(a) to 4(b), the predetermined area changes according to the target area of the de-block filtering. The error compensating area determining unit 11 determines the error compensating area based on the target area of the de-block filtering.

<Error Compensation>

Next, an error compensating unit 12 performs error compensation for an error compensating area.

Figure 5:
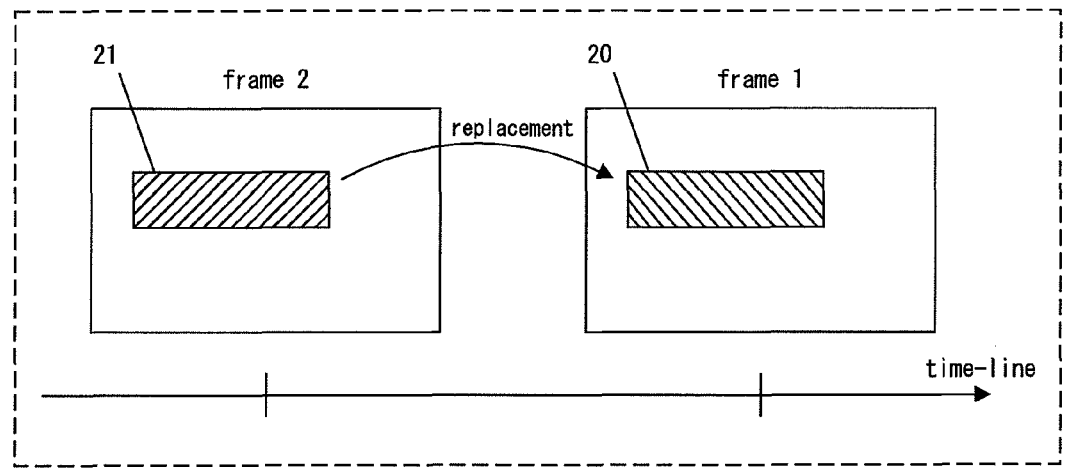
FIG. 5 is a diagram explaining error compensation in Embodiment 1 of the present invention.
Figure 6:
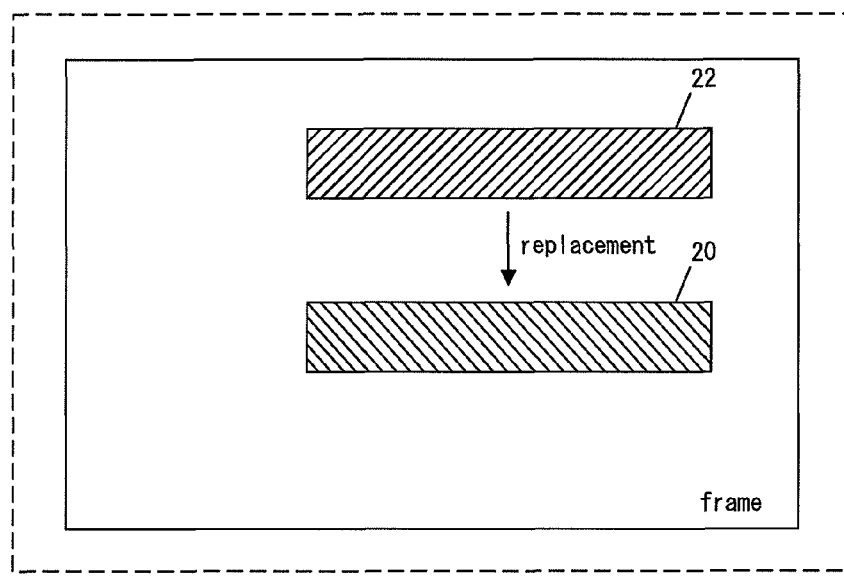
FIG. 6 is a diagram explaining error compensation in Embodiment 1 of the present invention.

Referring to FIG. 5 and FIG. 6, the following will now be explained. FIG. 5 and FIG. 6 are diagrams explaining error compensation in Embodiment 1 of the present invention.

<Error Compensation Using Previous Frame>

Next, processing of the error compensation will now be explained.

As shown in FIG. 5, the error compensating unit 12 replaces a value of a pixel included in an error compensating area 20 to a value of a corresponding pixel included in the previous frame in terms of time.

A frame 2 is the previous frame comparing to a frame 1 in terms of time. The frame 1 includes the error compensating area 20. The pixel included in the error compensating area 20 includes a decoding error or an influence caused by the decoding error. For this reason, the error compensating unit 12 replaces the value of the pixel included in the error compensating area 20 to the value of the corresponding pixel included in a replacement area 21 of the frame 2.

When the error compensating area 20 includes a plurality of pixels, the value of the pixel included in the error compensating area 20 is replaced to a value of a pixel, which is included in the replacement area 21 and the error compensating area 20 and corresponds to each pixel.

The pixel included in the replacement area 21 possesses the value differing from that of the frame 1 in terms of time. As long as the frame is very close to each other in terms of time, the gap is little; thus, the replacement does not cause a serious problem. As a result, comparing to the frame 1 in which the influence caused by the decoding error remains, quality deterioration for the displayed image of the replaced frame 1 is suppressed.

In addition, in the frame 2, it is preferable that the area of the replacement area 21 exists at the same location, where the area of the error compensating area 20 exists, considering the control of the image quality deterioration. However, even when the replacement area 21, whose location is adjacent to the location of the error compensating area 20, is used, it is possible to acquire an equal effect depending on an image status.

<Error Compensation Using Neighboring Pixel>

Alternatively, as shown in FIG. 6, the error compensating unit 12 replaces the value of the pixel included in the error compensating area to the value of the pixel included in a replacement area 22, which is adjacent to the error compensating area 20 in the same frame.

The area of the replacement area 22 can be adjacent to or not adjacent to the area of the error compensating area 20. However, considering the control of the image quality deterioration, it is preferable that the area is adjacent to the area of the error compensating area 20.

<Error Compensation Using Fixed Value>

Alternatively, the error compensating unit 12 replaces the value of the pixel included in the error compensating area to a fixed value. The fixed value can be the same value in the entire of the error compensating area, and also can be a different value depending on a location within the error compensating area.

With the above-mentioned structure, in addition to the pixel included in the unit area where the decoding error has occurred, the error compensation is performed to the pixel (pixel which performs de-block filtering using the pixel included in the unit area where the decoding error has occurred) included in the predetermined area that receives the influence of the unit area where the decoding error has occurred. As a result, it is possible to control the image quality deterioration in the boundary of the unit area where the decoding error has occurred.

<Error Compensation Using Pixel Before Filtering>

Moreover, the area of the predetermined area included in the error compensating area, which is targeted for the error compensation, may be the area where the decoding error has not occurred. Nevertheless, in the de-block filtering, since the pixel included to the unit area, where the decoding error has occurred, is used, it is necessary to perform the error compensation for the predetermined area. In other words, for the predetermined area, as long as it is the pixel before the de-block filtering, there is no bad influence caused by the decoding error.

For this reason, the error compensating unit 12 replaces the value of the pixel of the predetermined area included in the error compensating area to the value of the pixel which is a corresponding pixel included in the predetermined area, and is a pixel before de-block filtering. In addition, as mentioned on the above, the value of the pixel included in the error compensating area, other than the predetermined area, is replaced to the value of the pixel of the previous frame or to the fixed value.

Here, as the value of the pixel before the de-block filtering, a value of a pixel, in which the de-block filtering stored in the memory is not performed, is used. Alternatively, by performing calculation and inverse calculation of the filtering to the value of the pixel to which the de-block filtering is performed, the value of the pixel before the de-block filtering is calculated. By performing the inverse calculation of the de-block filtering, it is not necessary to store the value of the pixel before the de-block filtering.

In the predetermined area, since such error compensation can make the status back to the status before de-block filtering, the influence caused by the decoding error is eliminated. In the error compensating area other than the predetermined area, it is possible to reduce the influence caused by the decoding error by the replacement. As a result, it is possible to control the image quality deterioration very effectively.

In addition, it is preferable to use the slice, which is defined in H.263 or H.264, considering easiness of the processing. For this reason, the error compensating area determining unit 11 may determine a combined area of the slice in which the decoding error has occurred, and the slice including the pixel operable to perform the de-block filtering using the pixel included in the slice in which the decoding error has occurred, as the error compensating area. In this case, it is possible to reduce the processing burden in the error compensating area determining unit 11, and is possible to fully maintain the effect on controlling the image quality deterioration.

In addition, although the filtering in the in-loop filter 7 has taken as an example of the de-block filtering, the filtering is not limited to the de-block filtering. It may be any kind of filtering as long as the filtering uses a pixel of a different unit area.

Embodiment 2

Embodiment 2 will now be explained in the following.

The image decoding device 1 of Embodiment 2 switches the error compensating areas based on whether the filtering in the in-loop filter 7 will be executed or not.

Figure 7:
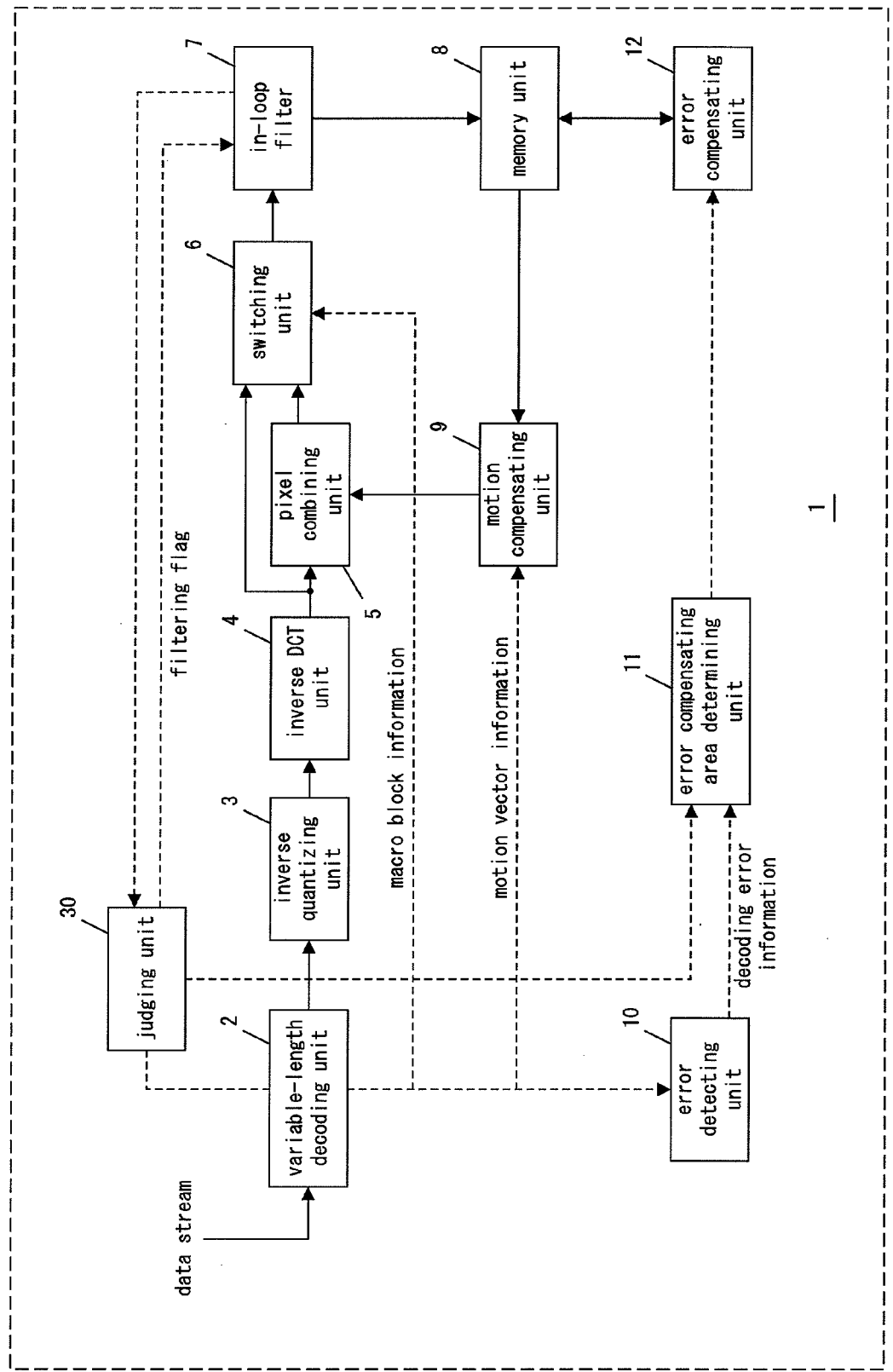
FIG. 7 is a block diagram of an image decoding device in Embodiment 2 of the present invention.

FIG. 7 is a block diagram of an image decoding device in Embodiment 2 of the present invention.

The image decoding device 1 shown in FIG. 7 newly comprises a judging unit 30.

The judging unit 30 judges whether the filtering using the pixel included in the different unit area in the in-loop filter 7 will be executed or not. The judging unit 30 judges whether or not the filtering will be executed by using a filtering flag included in a header that is analyzed by the variable-length decoding unit 2 (or the arithmetic decoding unit 13). The filtering flag includes information which the filtering will be executed or not. The judging unit 30 outputs the judgment result to the error compensating area determining unit 11.

When the judging unit 30 judges that the filtering will be executed, the error compensating area determining unit 11 determines both of the unit area where the decoding error has occurred and the predetermined area as the error compensating area. As explained in Embodiment 1, the predetermined area is an area including the pixel using a pixel, which exists in the area being adjacent to the unit area where the decoding error has occurred and is within the unit area where the decoding error has occurred, in the filtering.

In addition, at this time, the predetermined area may be an area of only a pixel using a pixel included in the unit area where the decoding error has occurred in the filtering, the entire of the unit area including the pixel, or a certain area that includes the pixel and another pixel.

When the judging unit 30 judges that the filtering will not be executed, the error compensating area determining unit 11 determines only the unit area where the decoding error has occurred, as the error compensating area. This is because the filtering is not performed, and the filtering by using the pixel included in the adjacent unit area is not performed. In other words, in the boundary of unit area, no pixel receives the influence of the adjacent unit area where the decoding error has occurred. In this case, since the error compensation is necessary only for the unit area where the decoding error has occurred, the error compensating area determining unit 11 determines only the unit area where the decoding error has occurred as an error compensating range.

<Judgment>

Next, a case, which the judging unit 30 judges whether the filtering will be executed or not for every filtering unit in the in-loop filter 7, will now be explained.

Figure 8:
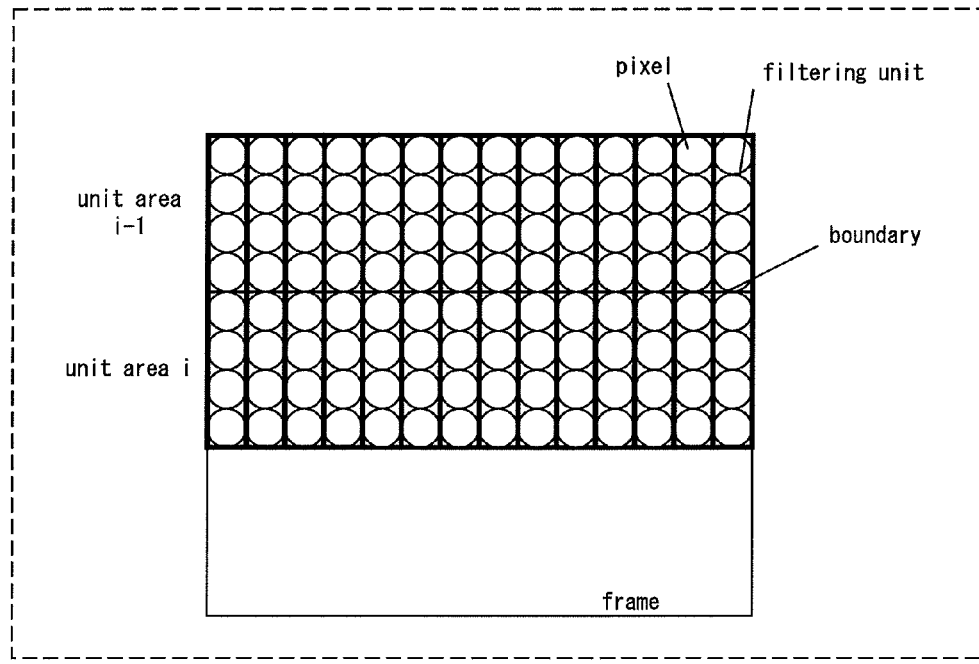
FIG. 8 is a diagram explaining a filtering unit in Embodiment 2 of the present invention.

FIG. 8 is a diagram explaining a filtering unit in Embodiment 2 of the present invention. The circle expresses a pixel. The unit area i and the unit area i−1, which are divided by the boundary, are included in the frame. 8 pixels surrounded by the bold-faced rectangle is an example of a filtering unit.

In addition, in FIG. 8, although eight pixels of the frame in the vertical direction are considered as the filtering unit, the direction may be a horizontal direction, and the number of pixels may be other than eight.

The judging unit 30 judges whether or not the filtering will be executed for every filtering unit. When the judgment for all filtering units, which exist on the boundary of the unit area i−1 and the unit area i, is completed, the judging unit 30 notifies the error compensating area determining unit 1 of the result.

For example, when the judgment result for all filtering units existed on the boundary is that the filtering will not be executed, the error compensating area determining unit 11 determines only the unit area where the decoding error has occurred as the error compensating area. In other words, the predetermined area is not added to the error compensating area.

On the other hand, when the part of the filtering unit is judged that the filtering will be executed, the error compensating area determining unit 11 determines the predetermined area and the unit area, where the decoding error has occurred, as the error compensating area. As explained in Embodiment 1, the predetermined area is an area including a pixel, which is a pixel included in the area being adjacent to the unit area where the decoding error has occurred, uses a pixel within the unit area where the decoding error has occurred, for filtering.

The error compensating unit 12 performs error compensation for the error compensating area determined by the error compensating area determining unit 11. As explained in Embodiment 1, the error compensation is, for example, replacing to the value of the pixel in the previous frame or the replacing to the value located at another position in the same frame.

The filtering flag indicates whether or not the filtering in the entire frame (or in the entire unit area) will be executed. For this reason, it is unclear to show details that the filtering near the boundary of unit area, which receives the influence caused by the decoding error, will be executed or not.

On the other hand, when the judging unit 30 judges for every filtering unit based on the actual filtering in the in-loop filter 7, regardless of the result of the filtering flag, it is possible to surely judge whether or not the filtering in a boundary of a certain unit area will be executed.

For this reason, for example, even though the filtering flag indicates that the filtering will be executed, when the actual filtering is not executed, the error compensating area determining unit 11 determines only the unit area, where the decoding error has occurred, as the error compensating area.

In other words, the error compensating area determining unit 11 can determine the smaller unit area as the error compensating area. Since the error compensation (such as replacement of a value of a pixel) to an area, where the error compensation is not necessary, is unnecessary, the burden required for the error compensation decreases. Moreover, it is possible to control the unnecessary image quality deterioration due to the unnecessary error compensation.

In addition, based on the result for ever filtering unit, which is judged by the judging unit 30, only the pixel included in the filtering unit, in which the filtering is executed, may be added to the error compensating area as the predetermined area. In this case, it is possible to realize the error compensation more finely.

On the other hand, even when the filtering is executed in the part of the filtering unit, all pixels included in all of the filtering units, which are the target, may be added to the error compensating area as the predetermined area.

Figure 9:
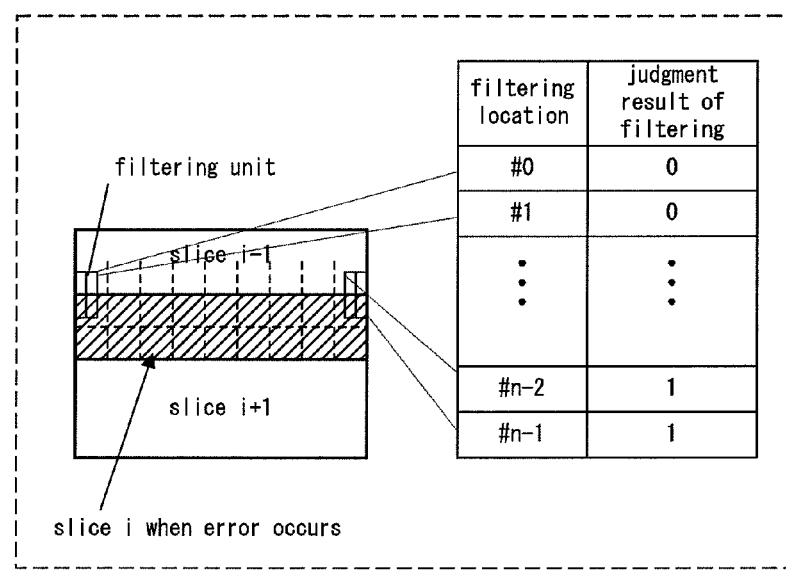
FIG. 9 is a diagram explaining a judgment method for every filtering unit in Embodiment 2 of the present invention.

FIG. 9 is a diagram explaining a judgment method for every filtering unit in Embodiment 2 of the present invention. Here, a slice is used as a unit area, and a decoding error has occurred in the slice i.

As shown in FIG. 9, at the boundary of the slice i−1 and the slice i, whether the filtering is executed or not for every filtering unit is judged. In FIG. 9, since the part of the filtering unit performs the filtering, the error compensating area determining unit 11 adds the area including the pixel included in the slice 1, in which the decoding error has occurred, and the pixel included in the slice i−1 used for the filtering, to the error compensating area.

Furthermore, as shown in FIG. 10, in addition to judging whether or not the filtering will be executed for every filtering unit, the judging unit 30 may judge a variable "bS value". By judging the "bS value", the predetermined area changes according to the changes of a filter area in the filtering performed in the in-loop filter 7. As a result, a suitable error compensating area is determined.

Figure 10A:
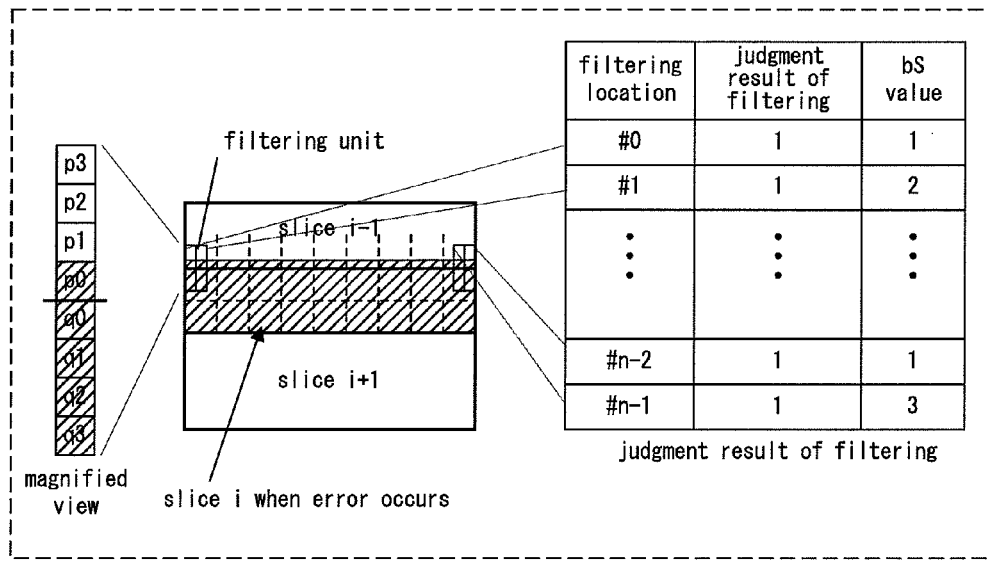
FIGS. 10 (a) and (b) are diagrams explaining a judgment method for every filtering unit in Embodiment 2 of the present invention.

FIGS. 10(a) and (b) are diagrams explaining a judgment method for every filtering unit in Embodiment 2 of the present invention.

In H.264, the range of the filtering changes according to the value of the "bS value". The value of "bS value" determines how many pixels from the slice boundary will be the filtering target. When it is based on the "bS value" judged by the judging unit 30, the error compensating area determining unit 11 can determine the error compensating area more suitably. It is because the filter area determined by the "bS value" is simply added to the error compensating area as the predetermined area.

In FIG. 10(a), the maximum of the "bS value" is a value "3." When the maximum of the "bS value" is the value "3", as shown in FIG. 10(a), the area up to one pixel from the slice boundary is the target for filtering. For this reason, the predetermined area is an area up to 1 pixel from the slice boundary (boundary with the slice i) of the slice i−1. The error compensating area is an area where the slice i is added to the predetermined area.

Figure 10B:
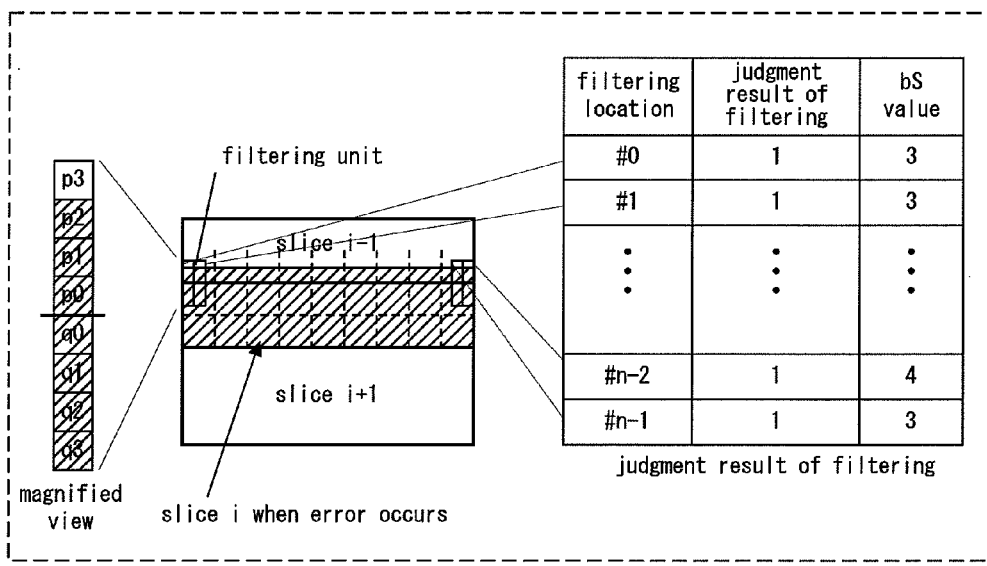

On the other hand, in FIG. 10(b), the maximum of the "bS value" is a value "4." For this reason, as shown in FIG. 10(b), the filtering unit whose area up to three pixels from the slice boundary is the target for filtering exists. For this reason, the predetermined area is an area up to three pixels from the slice boundary (boundary with the slice i) of the slice i−1. The error compensating area is an area where the slice i is added to the predetermined area.

The error compensating unit 12 performs the error compensation by replacing the pixel included in the determined error compensating area to the value of the previous frame, the value of the pixel located at another location of the same frame, or a fixed value of the pixel. The image quality deterioration caused by the decoding error is controlled by the error compensation.

As mentioned above, a suitable error compensating area can be determined based on the "bS value". As a result, it is possible to reduce the burden required for the error compensation in the error compensating unit 12, and is also possible to improve the processing speed. Moreover, although the pixel included in the error compensating area can be replaced to the value of the pixel included in the previous frame or the value of the pixel at another location, which is included in the same frame, the pixel, which does not need to be replaced, is not included in the error compensating area. Thus, it is possible to further control the image quality deterioration more effectively.

In addition, each element of the error detecting unit 10, the error compensating area determining unit 11, the error compensating unit 12, and the judging unit 30 may be consisted of hardware, software, or both of the hardware and software.

Moreover, the entire or the part of the image decoding device 1 may be the image decoding method that is consisted of the software.

Embodiment 3

Figure 11:
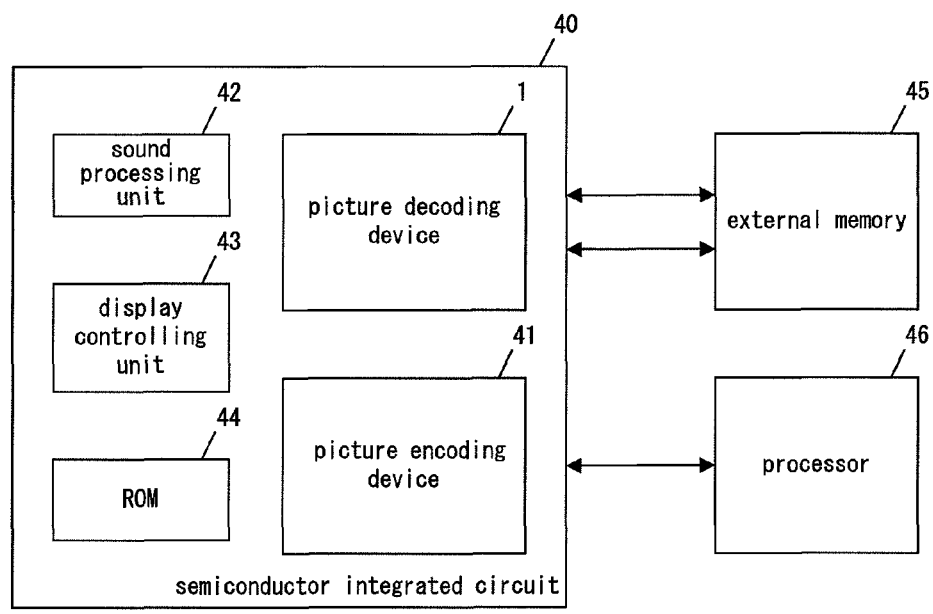
FIG. 11 is a block diagram of a semiconductor integrated circuit in Embodiment 3 of the present invention.

FIG. 11 is a block diagram of a semiconductor integrated circuit in Embodiment 3 of the present invention.

A semiconductor integrated circuit 40, in general, is composed of an MOS transistor. A specific logic circuit is realized by the connection construction of the MOS transistor. In recent years, the level of integration of the semiconductor integrated circuit has been improved; thus, it is possible to realize a very complicated logic circuit (for example, the image decoding device of the present invention) can be realized by one semiconductor integrated circuit or a couple of semiconductor integrated circuits.

The semiconductor integrated circuit 40 comprises the image decoding device 1 explained in Embodiments 1 and 2.

Depending on the necessity, the semiconductor integrated circuit 40 may comprise an image encoding device 41, a sound processing unit 42, a display controlling unit 43, and an ROM 44.

Furthermore, the semiconductor integrated circuit 40 may be connected to an external memory 45 and a processor 46.

As explained in Embodiments 1 and 2, the image decoding device 1, which the semiconductor integrated circuit 40 comprises, determines the unit area where the decoding error has occurred and the predetermined area including a pixel, which uses a pixel included in the unit area where the decoding error has occurred, for filtering, as the error compensating area, and then performs the error compensation.

As a result, even when the decoding error occurs, the semiconductor integrated circuit 40 can control the image quality deterioration of the displayed image.

In addition, since the semiconductor integrated circuit 40 is realized by the image decoding device 1, it is possible to realize miniaturization and low power consumption thereof.

Moreover, the memory required for decoding may be built in the semiconductor integrated circuit 40, or may be an external memory.

Embodiment 4

Figure 12:
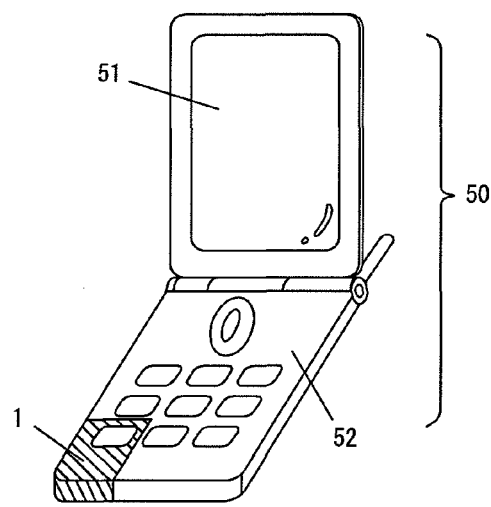
FIG. 12 is a perspective view of a mobile terminal in Embodiment 4 of the present invention.
Figure 13:
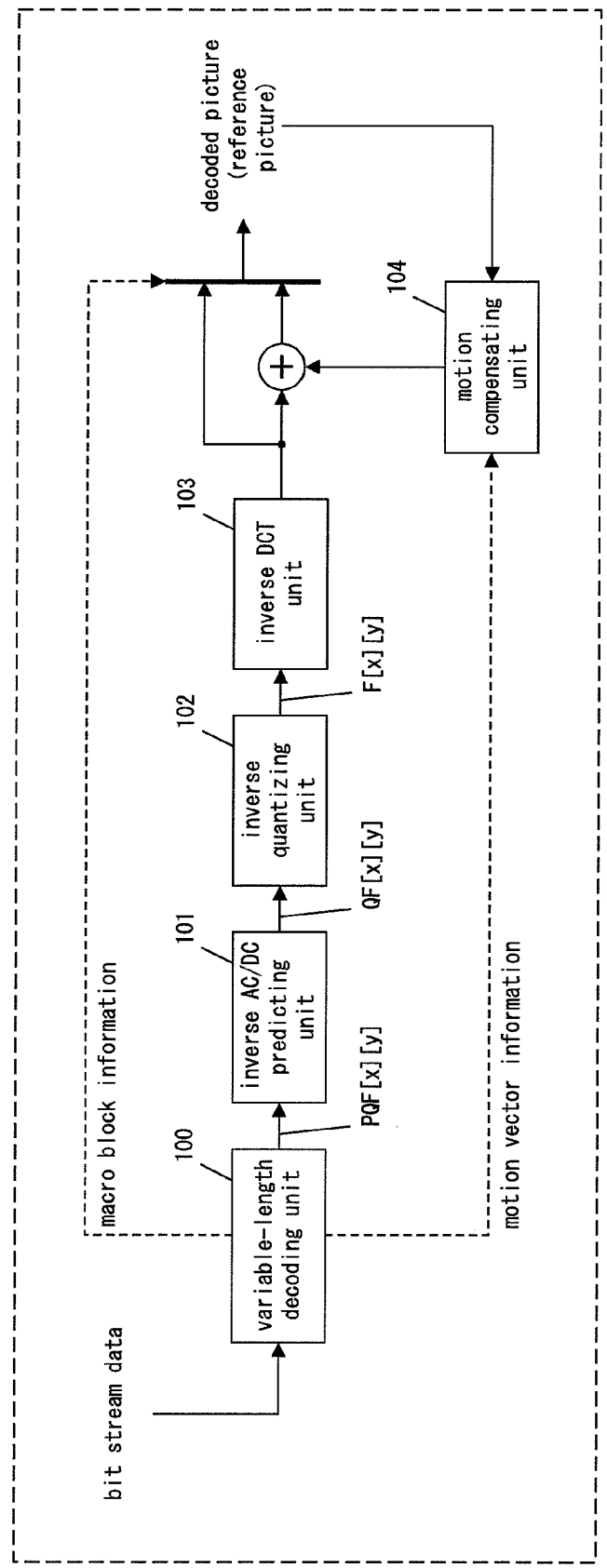
FIG. 13 is a block diagram of an image decoding device standardized by MPEG 4.
Figure 14:
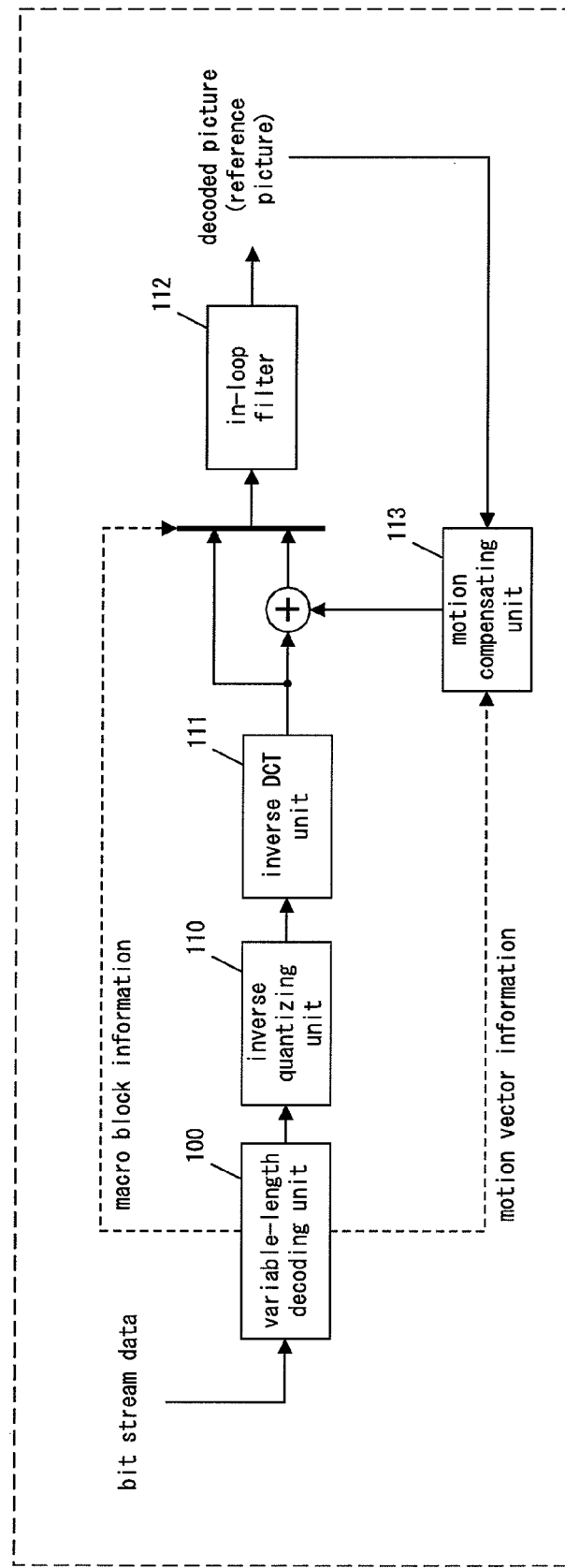
FIG. 14 is a block diagram of an image decoding device standardized by H.264.
Figure 15A:
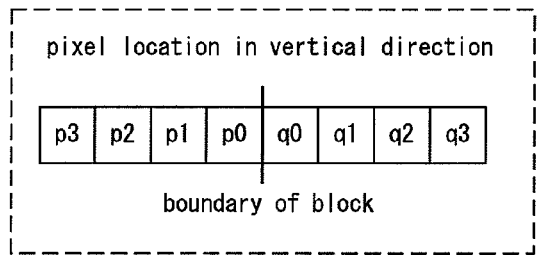
FIG. 15 is a diagram illustrating a pixel that is dealt with in de-block filtering.
Figure 15B:
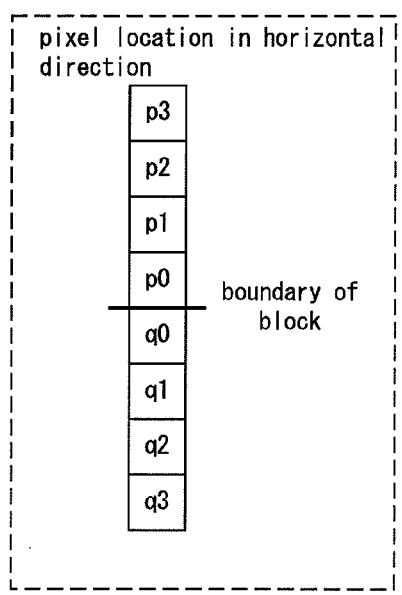
Figure 16:
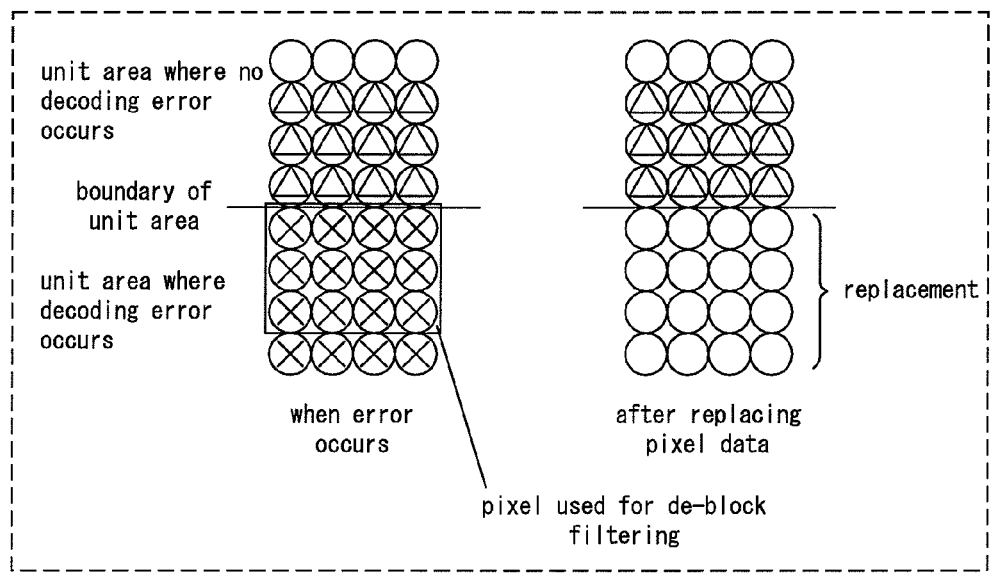
FIG. 16 is a diagram showing an influence caused by a decoding error in the conventional technology.

FIG. 12 is a perspective view of a mobile terminal in Embodiment 4 of the present invention.

A mobile terminal 50 is an electric device, such as a cellular phone, a PDA, a mail terminal, and a notebook computer.

The mobile terminal 50 comprises the image decoding device 1 explained in Embodiments 1 and 2. Moreover, the mobile terminal 50 comprises a displaying unit 51, and a key inputting unit 52; thus, telephone calls and mail communications are available.

The mobile terminal 50 performs image display on the displaying unit 51. For example, an image, which is taken by a digital camera included in the mobile terminal 50, is displayed, or a moving or still image, which has distributed via the Internet, is displayed. Moreover, the mobile terminal 50 may receive terrestrial digital television broadcasting. It is necessary to decode the image data encoded by H.264 standard in the terrestrial digital television broadcasting.

In the image decoding in order to display a still or moving picture, it is preferable to control the image quality deterioration caused by the decoding error.

As explained in Embodiments 1 and 2, the image decoding device 1 equipped with the mobile terminal 50 can suppress the image quality deterioration of the displayed image even when the decoding error occurs.

The mobile terminal 50 often receives distribution of an image while moving. For example, in reception of the terrestrial digital television broadcasting, since the mobile terminal 50 receives it while moving, the decoding error tends to occur. However, since the image decoding device 1 equipped with the mobile terminal 50 performs the error compensation for the unit area where the decoding error has occurred, and another area which receives the influence caused by the decoding error, it is possible to suppress the image quality deterioration effectively.

Since the image decoding device related to the present invention is built in the mobile terminal, the image quality deterioration is suppressed with high efficiency.

INDUSTRIAL APPLICABILITY

The present invention can be suitably used in a field of image decoding including filtering, for example, de-block filtering.

The invention claimed is:

1. An image decoding device, comprising:
a non-transitory memory device storing a program executable by a processor, the program causing the image decoding device to operate as:
an error detecting unit operable to detect a decoding error in each unit area in one frame of an image;
an error compensating determining unit operable to determine an area needing error compensation; and
an error compensating unit operable to perform error compensation for the area needing error compensation,
wherein the error compensating determining unit determines an unit area where the decoding error occurs and an additional area adjacent to the unit area where the decoding error occurs as the area needing error compensation,
wherein the unit area is constituted by a unit of a slice or a macro block, and
wherein the additional area includes a target pixel that has been subjected to in-loop filtering using a pixel included in the unit area where the decoding error occurs.

2. The image decoding device as defined in claim 1, wherein the unit area is formed in accordance with a receiving condition.

3. The image decoding device as defined in claim 1, wherein the decoding error includes an arithmetic decoding error or a variable-length decoding error.

4. The image decoding device as defined in claim 1, further comprising:
a judging unit operable to judge that an in-loop filtering condition is an executed condition,
wherein when a result of the judging by the judging unit indicates that in-loop filtering is in the executed condition, the error compensating determining unit determines the additional area as an area including a target pixel that has been subjected to in-loop filtering based on a pixel included in the unit area where the decoding error occurs.

5. The image decoding device as defined in claim 1, wherein the error compensating determining unit changes the additional area when a target area of the in-loop filtering changes.

6. The image decoding device as defined in claim 1, wherein the error compensating unit replaces a value of a pixel included in the area needing error compensation of the one frame of the image with a value of a corresponding pixel included in a frame prior to the one frame of the image.

7. The image decoding device as defined in claim 1, wherein the error compensating unit replaces a value of a pixel included in the area needing error compensation with a value of a pixel neighboring the area needing error compensation.

8. The image decoding device as defined in claim 1, wherein the error compensating unit replaces a value of a pixel included in the area needing error compensation with a fixed value.

9. The image decoding device as defined in claim 1, wherein the error compensating unit replaces a value of a pixel included in the additional area of the area needing error compensation with a value of the same pixel in the additional area before an in-loop filtering is applied.

10. An integrated semiconductor circuit comprising an image decoding device as defined in claim 1.

11. An image decoding method, comprising:
detecting, using an error detecting unit, a decoding error in each unit area in one frame of an image;
determining, using an error compensating determining unit, an area needing error compensation; and
performing, using an error compensating unit, error compensation for the area needing error compensation,
wherein the performing error compensation includes determining an unit area where the decoding error occurs and an additional area adjacent to the unit area where the decoding error occurs as the area needing error compensation,
wherein the unit area is constituted by a unit of a slice or a macro block, and
wherein the additional area includes a target pixel that has been subjected to in-loop filtering using a pixel included in the unit area where the decoding error occurs.

12. The image decoding method as defined in claim 11, wherein the performing error compensation includes replacing a value of a pixel included in the area needing error compensation with a value of a corresponding pixel included in a frame prior to the one frame of the image, a value of a pixel neighboring the area needing error compensation or a fixed value.

* * * * *